United States Patent [19]

Nineuil et al.

[11] 4,369,169

[45] Jan. 18, 1983

[54] PRETREATMENT OF CRUDE WET PROCESS PHOSPHORIC ACID

[75] Inventors: Guy Nineuil, Bihorel; Jean Boutin, Mions; Maurice Chambon, St. Genis Laval, all of France

[73] Assignee: Rhone-Poulenc Industries, Paris, France

[21] Appl. No.: 114,204

[22] Filed: Jan. 22, 1980

[30] Foreign Application Priority Data

Jan. 24, 1979 [FR] France .................................. 79 01752

[51] Int. Cl.³ .............................................. C01B 25/16
[52] U.S. Cl. .............................. 423/321 R; 423/321 S
[58] Field of Search ................. 423/320, 321 R, 321 S

[56] References Cited

U.S. PATENT DOCUMENTS

T971,006  6/1978  Smith .............................. 423/321 R
2,936,888  5/1960  Williams ......................... 423/321 R
2,968,528  1/1961  Tuttle et al. ..................... 423/321 R
3,099,622  7/1963  Woerther ......................... 423/321 R
4,256,570  3/1981  Allen et al. ........................ 423/321

Primary Examiner—Earl C. Thomas
Assistant Examiner—Gregory A. Heller
Attorney, Agent, or Firm—Burns, Doane, Swecker & Mathis

[57] ABSTRACT

Crude wet process phosphoric acid is pretreated, to ensure against impurity precipitation and objectionable coloration during the downstream processing, e.g., liquid-liquid extraction thereof, by first homogeneously admixing same with an impurity adsorbent, next mixing the liquid dispersion which results with a liquid suspension of a flocculating agent, maintaining the resulting admixture under nonshearing agitation until same separates into a flocculated phase and a liquid solution phase, and then separating therefrom the flocculated phase and a purified, product acid liquid solution phase.

25 Claims, 1 Drawing Figure

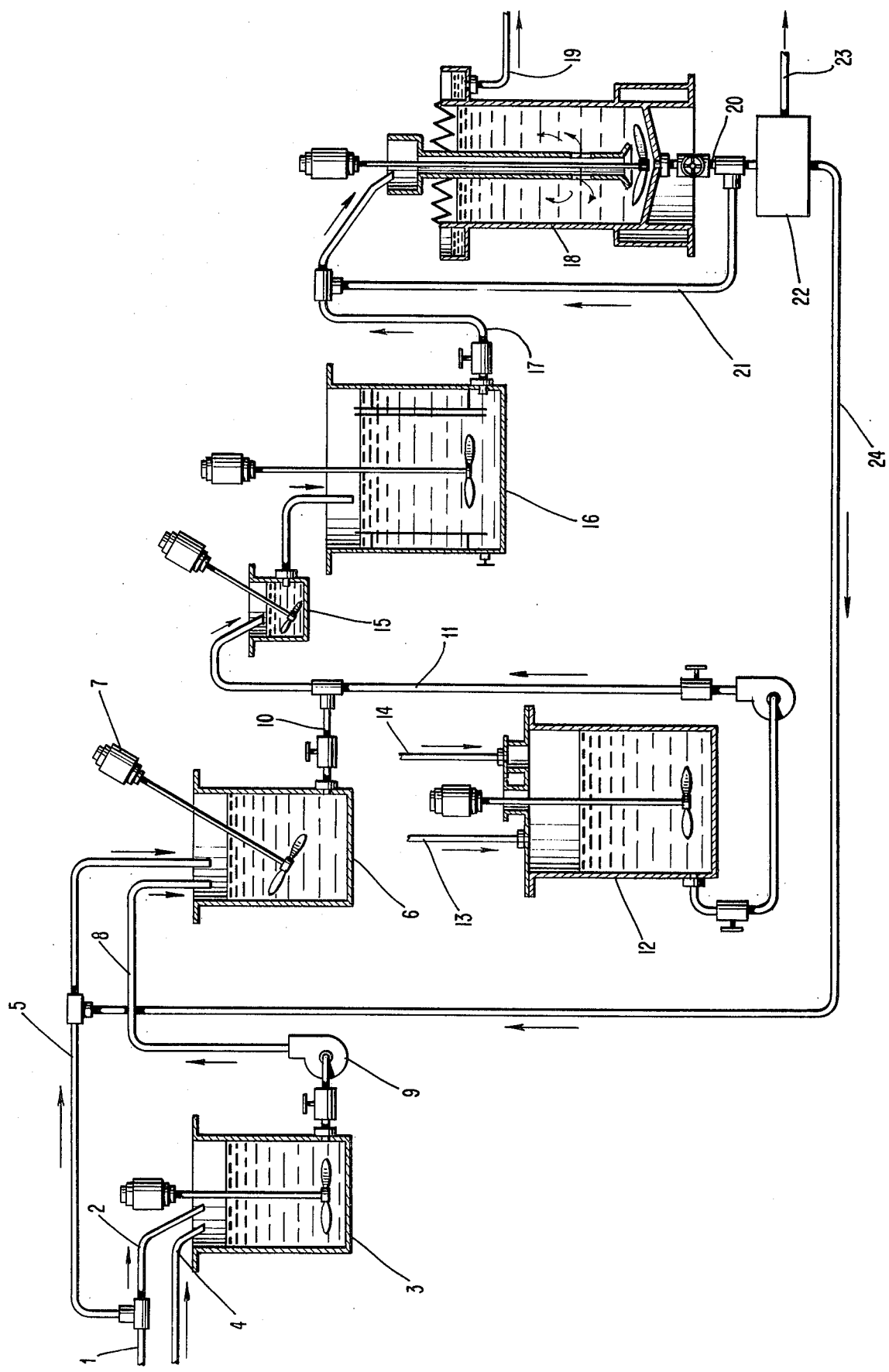

PRETREATMENT OF CRUDE WET PROCESS PHOSPHORIC ACID

BACKGROUND OF THE INVENTION

1. Field of the Invention

The present invention relates to the treatment of an impure phosphoric acid, and, more especially, relates to the treatment of raw, wet process phosphoric acid prior to the conventional liquid-liquid extraction thereof.

2. Description of the Prior Art

It is well known to this art that the digestion of phosphate rock with a strong mineral acid, such as sulfuric acid, yields an aqueous suspension of phosphoric acid, which, after the filtration therefrom of the gypsum concomitantly formed therein provides a phosphoric acid solution containing numerous and varied impurities. These impurities result from the individual impurities or contaminants contained in the beginning rock and solubilized during the attack of the sulfuric acid, or remaining in the phosphoric acid, after filtration of the gypsum, as fine particles in suspension. Such impurities comprise mineral materials, such as colloidal silica materials, compounds of aluminum, iron, calcium and magnesium, fluorides, sulfates, compounds of uranium and of the rare earth metals, various organic substances, such as humic acids contained in the beginning rock and organic materials intentionally introduced during the pretreatment of the mineral or during the digestion thereof, and generally comprising fatty acids, amines or hydrocarbons. Certain of these impurities are in a state of saturation or supersaturation so that the solution only rarely attains a stable state.

The subsequent typical treatments of the raw solution of phosphoric acid noted hereinabove by means of a combination of solvent extractions and liquid-liquid reextraction is fraught with numerous complexities and difficulties. During this subsequent treatment, the presence of the solvent, together with the agitation of the aqueous and organic phases in a mixer-decanter train accelerate the precipitation of the impurities in the saturated or supersaturated state, which then accumulate at the base of the apparatus. On the other hand, an intermediate colored organic phase appears at the interface of the aqueous and organic phases, containing the organic impurities of the raw acid. Upon the start-up of an extraction unit, these phenomena first manifest themselves in the inlet mixer-decanter of the process battery or train and are then propagated into the following units, necessitating that the battery or apparatus train be periodically shut down for cleaning. It is impossible under these conditions to operate the apparatus in a continuous and industrially profitable manner. Furthermore, it appears that the intermediate colored organic phase solubilizes the extraction agent typically introduced into the organic phase and thereby modifies the partition coefficients of the valuable metallic impurities. A great need exists in this industry, therefore, for a process for the treatment of crude, wet process phosphoric acid in order to first remove therefrom the major part of precipitable mineral and organic impurities from the acid and to facilitate additional downstream treatment. Generally compare French Pat. Nos. 1,336,816, 1,564,461 and 2,255,376, and U.S. Pat. No. 3,186,793.

SUMMARY OF THE INVENTION

Accordingly, a major object of the present invention is the provision of a novel process for the treatment of raw, wet process phosphoric acid in order to avoid the disadvantages, difficulties and drawbacks mentioned hereinabove and to enable the facile downstream application thereto of conventional liquid-liquid extraction processes by means of organic solutions and of re-extraction with water in a simple and continuous manner, such process being characterized in that it comprises:

[i] In a first stage, the treatment of the raw phosphoric acid solution with an adsorbent under conditions such that the adsorbent is dispersed in the raw phosphoric acid solution over a period of time of from 30 minutes to two hours;

[ii] In a second stage, the dispersion of a flocculant, or flocculating agent, into the foregoing dispersion [i];

[iii] In a third stage, the maintenance of the mixture which results under nonshearing agitation for a period of time of from 30 minutes to three hours, whereby the suspension is separated into a solution and a flocculated phase; and

[iv] The separation of the phases, whereby a stable and purified phosphoric acid solution is recovered, suitable for facile downstream processing via a combination of liquid-liquid extractions.

BRIEF DESCRIPTION OF THE DRAWINGS

The FIGURE of Drawing is a schematic representation of apparatus/process well suited for carrying out the invention and which is given purely by way of illustration and without limitation.

DETAILED DESCRIPTION OF THE INVENTION

More particularly according to the invention, an aqueous solution of raw phosphoric acid is obtained originating from the digestion of phosphate rock by means of strong mineral acid, such as sulfuric acid, and which is first subjected to filtration to eliminate the gypsum therefrom. The raw or crude solution typically has a $P_2O_5$ concentration by weight of between 26 and 40%, preferably about 30%, a calcium content by weight, expressed as CaO, generally between 2 and 5 g/liter as a function of the excess $H_2SO_4$ present and of the temperature of the raw acid. The raw acid contains organic impurities which are characterized by the measure of the colorimetric index, at 400 mu, of a tributyl phosphate solution having served to extract the raw acid on a volume for volume basis. After the filtration of the gypsum, the raw acid is typically maintained in a storage vat at a temperature of about 40° C. for at least 12 hours.

In the first stage of the process according to the invention, the aforenoted phosphoric acid solution is treated with a solid adsorbent agent under conditions such that there results intimate contact between the adsorbent and the aqueous solution. According to one embodiment of this first stage, the adsorbent is introduced in powder form into a vessel containing the raw acid and the aqueous solution, the vessel being equipped with an agitator adapted to effect vigorous and intense shearing in order to very well disperse the adsorbent. According to a second embodiment, the adsorbent is first formulated into a paste in an aliquot taken from the solution of raw acid, by means of conventional paste making apparatus. Subsequently, the paste obtained is introduced into a vessel containing the raw acid and provided with agitation sufficient to homogeneously disperse the paste in the solution. According to yet a third embodiment, a concentrated dispersion of the adsorbent is prepared in aqueous solution having a content thereof on the order of 5% by weight, and same is subsequently brought into contact with the raw acid. The contact time between the adsorbent and the solution is preferably between 30 minutes and two hours, while maintaining agitation sufficient to maintain to adsorbent in suspension. It is possible to chart the course of action of the adsorbent by measuring the coloration of the acid, even though this measure is not necessarily determining in character. The decoloration of the treated raw acid typically commences after a treatment period of 30 minutes and continues for approximately 1 hour and 30 minutes. The amount of the adsorbent utilized in a function of several factors, including the mode of the digestion of the phosphate rock, the adsorbent qualities of the agent, its mode of introduction into the system and the type of agitation, i.e., its state of dispersion. Usually, according to the invention, the quantity of the adsorbent required is between 0.5 and 10 g per liter of the raw phosphoric acid solution, preferably between 2 and 4 g per liter. The temperature during this first stage of the process is not critical and may vary from 20° to 50° C., depending on how well the adsorbent is dispersed. However, in actual practice it is preferable to conduct the process at a temperature of about 40° C.

Exemplary of the many adsorbents suitable for carrying out the invention, there are mentioned, albeit without limitation: active carbon, natural materials of montmorillonite type, such as bentonite, synthetic bentonites, diatomaceous earth, activated silica, aluminosilicates, activated clays, and the like. Among the foregoing, the synthetic bentonites are especially preferred.

The contacting of the solution of the raw phosphoric acid may be effected in any suitable type of mixer known to the art, equipped with means for agitation sufficient to effect a perfect dispersion of the adsorbent and to maintain the latter in suspension throughout the contact period.

In the second stage of the process, the first stage suspension of the adsorbent is treated with a flocculating agent additive. Exemplary flocculating agents include, without limitation: synthetic organic compounds ionic in character, such an anionic polyelectrolytes, e.g., partially hydrolyzed polyacrylates, or acrylate-acrylamide copolymers and their salts, alkali metal polyacrylates and polymethyacrylates, sulfonated polystyrenes, and the like, provided that the flocculating agent is stable in the liquid medium and at the temperature utilized. Generally, the polyacrylamides and acrylamide and acrylic acid copolymers are preferred. The flocculating agent is conveniently introduced into the dispersion of the adsorbent in the phosphoric acid solution in the form of a previously prepared aqueous suspension, in order to facilitate distribution; the preliminary suspension is first prepared by conventional means. The suspension of the flocculating agent is usually maintained under slow agitation at ambient temperature for several hours to develop the flocculating characteristics thereof. The concentration of the flocculating agent in the preliminary suspension is not critical, but it is preferred to maintain same at between 0.5 and 5 g per liter. The volume of the solution introduced into the dispersion of the adsorbent in the solution of the phosphoric acid is such that the quantity of the flocculating agent in the resulting mixture is between 1 and 20 mg per liter of the final mixture, preferably on the order of 2 mg per liter. The second stage treatment is effected in a simple manner, either by introducing the phosphoric acid suspension and the solution of the flocculating agent into an intermediate vessel equipped with agitation sufficient to homogenize the mixture at a flow rate circumscribed by the quantities previously employed, or more simply to introduce the suspension of the flocculating agent into the outlet line of the phosphoric dispersion of the vessel of the first stage leading to the vessel comprising the succeeding third stage, by means of conduit lateral to the outlet tube, in a precalculated volumetric proportion, while insuring satisfactory mixing of the two phases. This may be effected either by predilution, or by means of a static mixer, or by any other means affording good homogenization.

In the third stage of the process of the invention, the mixture resulting from the second stage is maintained under nonshearing agitation for a period of time between 30 minutes and three hours, whereby the suspension separates into a liquid phase and a flocculated phase. The velocity of the nonshearing agitation is defined as that velocity inducing the growth of particles of insoluble materials and the rapid sedimentation of said particles. This velocity is a function of the dimension and the shape of the vessels and the dimension and the configuration of the agitator; these parameters are well known to those skilled in the art. According to a first embodiment of the third stage, a single vessel is employed having a generally cylindrical configuration with a vertical axis and equipped with a blade agitator rotating at low velocity and centered on the axis of the vessel. The suspension issuing from the second stage is introduced into the axial region of this vessel in a continuous manner. A clear solution of phosphoric acid is continuously withdrawn from this vessel, which solution constitutes the desired final product, while from the base of such vessel the flocculate is removed, to be subsequently separated. The resulting liquor is combined with the raw acid and the solid residue is eliminated. The retention time for the suspension in the single vessel is generally in excess of 30 minutes. In a second, more preferred embodiment, two successive vessels are utilized. In the first vessel, hereby designated the aging vessel, and being of the type described in the aforesaid first embodiment, the suspension resulting from the second stage is introduced and therein retained, generally for 15 to 60 minutes. The suspension is continuously withdrawn in its entirety from the base of the apparatus and is conveyed to the axial region of a decanter having a flattened cylindrico-conical configuration, equipped with an axial scraper. The flocculate collects at the bottom of the cone and is moved to the central axis by the scraper, from where it is withdrawn. From the surface, at the cylindrical periphery, the product phosphoric acid solution is withdrawn. This solution is subsequently conveyed to a storage vat, where it is optionally subjected to a stabilizing treatment by means of slow agitation at moderate temperatures for a period on the order of 24 hours.

The flocculate withdrawn may be directly treated in a separation apparatus or it may be divided into two flows, one of which is combined with the flow of acid at the head of the third stage or upstream of the decantation apparatus, if two vessels are used in the third stage, while the other flow is subjected to separation.

The temperature during the second and third stages of the process is not critical and may vary over a very broad range, provided that the flocculating agent is not adversley affected or degraded by the aggressiveness of the medium. The temperature is typically between 20° and 50° C., but operation at 40° C. is preferred.

The invention will be better illustrated by reference to the attached FIGURE of Drawing, wherein the raw phosphoric acid, emanating from a storage vat after the filtration of the gypsum therefrom, is introduced into the system by means of feed line 1. A portion of the inlet flow is diverted as the stream 2 to feed the vessel 3 for the preparation of a concentrated suspension of the flocculating agent in the initial acid by means of a high speed turbine, the flocculating agent being introduced via the line 4. The second portion of the inlet flow of phosphoric acid to be treated is fed to the vessel 6 via line 5, said vessel 6 enabling the contacting of the adsorbent and the acid and being equipped with a high speed eccentric turbine 7, but not of such high speed as to generate a vortex; the concentrated suspension of the flocculating agent is introduced therein from the vessel 3 by means of the feed line 8 and associated pump 9. After a retention time as indicated hereinabove, the suspension is recovered from the base of the vessel by means of outlet conduit 10. To the flow 10, a stream 11 of the suspension of the flocculating agent in water is added, same emanating from the vessel 12 and obtained by mixing water and the flocculating agent respectively introduced through the inlets 13 and 14. The combined flow 10, 11 is fed to an intermediate homogenizer 15 and then to the aging vessel 16 cylindrical in configuration and equipped with a low speed agitator having three inclined blades and a diameter equal to one third of the diameter of the vessel. After the suspension has sufficiently aged or ripened, it is withdrawn from the base of the aging vessel by means of the line 17 and same is introduced into the axial and central portion of the decanter 18, cylindrico-conical in configuration and equipped with a slow moving scraper. After the suspension is decanted, a purified and clarified solution of phosphoric acid is recovered as overhead via line 19, the same constituting the desired product, and the flocculate is withdrawn from the base of this vessel via line 20. The flocculate may be divided into a flow 21 to be combined with the flow 17 feeding the decanter, and a flow feeding the separation apparatus 22, wherein a solid product 23 is separated, which is then discarded, and a liquor, which is combined by means of the line 24 with the initial flow 5. In another embodiment, the flow 21 may be eliminated.

In order to further illustrate the present invention and the advantages thereof, the following examples are given, it being understood that same are intended only as illustrative and in nowise limitative.

EXAMPLE 1

A raw phosphoric acid obtained via the sulfuric acid digestion of Togo phosphate rock was utilized, the same being supplied from a storage vat which was maintained at 50° C. The characteristics of the crude and purified products are reflected in the Table I hereinbelow.

The apparatus employed was that illustrated in the FIGURE of Drawing; the entire process was conducted at 40° C.

The raw acid was introduced, at a rate of 500 liters per hour, into the adsorbent tank 6, which had a height of 1 m and a diameter of 0.64 m, and which was equipped with an eccentric turbine mixer located at the bottom thereof and which was rotated at 800 rpm. A 5% by weight suspension of a mixture of Bentonite WYV (one part by weight) and of Bentonite FGNFR4 (two parts by weight), marketed by the CECA Company, in raw acid, was also introduced into the tank 6, at a rate of 20 liters per hour. The resultant suspension was recovered and flowed through the homogenizer 15 into the aging vessel 16, said aging vessel having the dimensions of $\phi=0.90$ m, h=1 m, being equipped with an agitator having three inclined blades rotating at 24 rotations per hour, after having been combined, at a flow rate of 1 liter per hour, with a suspension, in water, of Flocogyl AD 37 (polyacrylamide, marketed by Rhone-Poulenc Industries), formulated at 1 gram per liter, said suspension emanating from the mixer 12. The suspension was recovered from the base of this vessel and conveyed to the decanter 18 having the dimensions of $\phi=0.8$ m, h=0.95, equipped with a scraper rotating at 0.2 rpm. The flocculate was withdrawn from the base of this vessel and separated from its liquor, which was combined with the raw acid. From the head of the decanter, the purified acid was recovered and was conveyed to a desaturator for a period of 24 hours at 40° C., and was then filtered and stored at 50° C., prior to use.

TABLE I

| Components, % by weight | Crude acid | Purified acid after decantation | Purified acid after desaturation and filtration |
|---|---|---|---|
| $P_2O_5$ | 28 | 28 | 28 |
| CaO | 0.26 | 0.24 | 0.22 |
| $SO_4$— | 1.7 | 1.60 | 1.32 |
| Organic materials: Colorimetric index* | 2 | 0.7 | 0.7 |

*The colorimetric index was that of a tributyl phosphate solution, after having extracted therefrom, on a volume for volume basis, the organic matter from the acid. The index was measured at 400 mμ by extinction across a test cell, 5 cm long, with the 100% measure of the test apparatus being established as that of pure tributyl phosphate.

The acid obtained was suitable, without the disadvantages mentioned hereinabove, for processing for the recovery of valuable products by means of conventional liquid-liquid extraction techniques.

EXAMPLE 2 AND COMPARATIVE EXAMPLES 3 TO 5

In these examples, a three-stage embodiment of the invention was performed, and compared with a counterpart process using the same starting materials in like amounts, but such counterpart process being conducted with all additions and holding times, etc., occurring simultaneously, in a single stage.

The following were employed in each example:

[i] As the adsorbent, a 50% by weight mixture, in water, of ⅓ part by weight of Bentonite WYV and ⅔ part by weight of Bentonite FGNFR4,

[ii] As the flocculating agent, a 0.5 g/liter aqueous solution of Flocogyl AD 37 (marketed by Rhone-Poulenc Industries).

All processing steps were effected at 40° C. in a two liter cylindrical vessel equipped with an agitator (straight turbine; 50 mm long, 15 mm high).

The decantation comparisons were performed in a 1 liter test column maintained at 40° C.; the colorimetric indices were as in Example 1.

Experimental conditions and the results thereof are compiled in Table II hereunder.

As will be seen from the Table II, with the amounts of the flocculating agent and the adsorbent within the ambit of the present invention, regardless of the duration of agitation, and with the simultaneous introduction of the aforesaid two agents, it is impossible to obtain satisfactory decoloration together with a satisfactory velocity of decantation vis-a-vis that process conducted strictly in accordance with the present invention.

TABLE II

| Example | Example 2 per invention | Comparative Example 3 | Comparative Example 4 | Comparative Example 5 |
|---|---|---|---|---|
| Amount of adsorbent in the final solution | 2 g/l | 0.5 g/l | 10 g/l | 10 g/l |
| Amount of flocculating agent in the final solution | 20 mg/l | 20 mg/l | 20 mg/l | 20 mg/l |
| Mode of treatment | (1) Mixture of acid and adsorbent: 15 seconds at 310 rpm 29 minutes, 45 seconds at 210 rpm (2) Above mixture + solution of flocculating agent: 2 minutes at 100 rpm aging, 45 minutes at 100 rpm | Acid mixture + adsorbent + flocculating agent, simultaneous addition agitation, 1 min at 310 rpm agitation, 4 min at 130 rpm | Acid mixture + adsorbent + flocculating agent, simultaneous addition agitation, 1 min at 310 rpm agitation, 29 min at 130 rpm | Acid mixture + adsorbent + flocculating agent, simultaneous addition agitation, 1 min at 310 rpm agitation, 15 min at 130 rpm |
| Decantation test Flocculate volume (%), after | | | | |
| 30 min | 9 | 4 | 26 | 27 |
| 120 min | 8 | 4 | 24 | 25 |
| Acid content (treated) after 120 min: | | | | |
| CaO (g/l) | 1.23 | 1.0 | 1.48 | 1.19 |
| $SO_4$ (g/l) | 11.1 | 8.8 | 9.6 | 9.4 |
| Colorimetric index of acid treated for 120 min | 0.55 | 1.30 | 0.85 | 0.55 |

Initial raw acid:
Colorimetric index 2.25
CaO content 4.9 g/liter
$SO_4$ content 16.6 g/liter While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the purification of a crude, wet process phosphoric acid, comprising (i) first homogeneously admixing same with a solid adsorbent for a period of time ranging from about 30 minutes to about 2 hours, (ii) next mixing the resultant liquid dispersion with a liquid formulation of a flocculating agent, (iii) maintaining the admixture which then results under nonshearing agitation until same separates into a flocculated phase and a liquid solution phase, and (iv) thence separating therefrom the flocculated phase and a purified, product acid liquid solution phase.

2. The process as defined by claim 1, the crude, wet process phosphoric acid starting material having been subjected to a preliminary filtration.

3. The process as defined by claim 2, said starting material acid having a $P_2O_5$ content, by weight, of from about 26 to 40%.

4. The process as defined by claim 3, said starting material acid having been maintained at a temperature of about 40° C. for at least about 12 hours prior to purification.

5. The process as defined by claim 3, wherein the adsorbent is selected from the group consisting of active carbon, montomorillonite, diatomaceous earth, activated silica, aluminosilicate, and activated clay.

6. The process as defined by claim 5, wherein the adsorbent is synthetic bentonite.

7. The process as defined by claim 5, wherein the adsorbent is utilized in an amount of from about 0.5 to 10 g per liter of starting material acid.

8. The process as defined by claim 7, wherein the adsorbent is utilized in an amount of from about 2 to 4 g per liter of starting material acid.

9. The process as defined by claim 7, a powdery adsorbent being admixed with the starting material acid under such agitation as to effect the homogeneous dispersion thereof.

10. The process as defined by claim 7, a pasty adsorbent, in an aliquot of the starting material acid, being homogeneously admixed with said starting material acid.

11. The process as defined by claim 7, a concentrated aqueous suspension of adsorbent being homogeneously admixed with the starting material acid.

12. The process as defined by claim 7, the flocculating agent being an anionic polyelectrolyte.

13. The process as defined by claim 7, the flocculating agent being selected from the group consisting of polyacrylamide, acrylamide/acrylic acid copolymers, polyacrylate, polymethacrylate, sulfonated polystyrene, partially hydrolyzed polyacrylate, and salts thereof.

14. The process as defined by claim 13, the flocculating agent being selected from the group consisting of polyacrylamide, acrylamide/acrylic acid copolymer, and salts thereof.

15. The process as defined by claim 14, the flocculating agent being formulated in water.

16. The process as defined by claim 15, wherein the flocculating agent is formulated in an amount of from about 1 to 20 mg per liter of formulation.

17. The process as defined by claim 16, wherein, prior to the admixture under nonshearing agitation, the aqueous formulation of flocculating agent, the liquid adsorbent dispersion and the starting material acid are intermediately homogenized.

18. The process as defined by claim 17, the admixture being maintained under nonshearing agitation for from about 30 minutes to 3 hours.

19. The process as defined by claim 18, wherein the separated product of nonshearing agitation is decanted into a flocculated phase and the product acid liquid solution phase.

20. The process as defined by claim 19, said flocculated phase being separated into a solids fraction and a liquor fraction, with said liquor fraction being recycled to the starting material acid feed.

21. The process as defined by claim 20, further comprising recycling a portion of the decanted flocculated phase to the decanter feed.

22. The process as defined by claim 1, further comprising subjecting the product acid liquid solution phase to liquid-liquid extraction.

23. The process as defined by claim 19, further comprising subjecting the product acid liquid solution phase to liquid-liquid extraction.

24. The process as defined by claim 1, the admixture being maintained under nonshearing agitation for from about 30 minutes to 3 hours.

25. A process for the purification of a crude, wet process phosphoric acid, comprising (i) first homogeneously admixing same with a solid adsorbent for a period of time ranging from about 30 minutes to about 2 hours, wherein said solid adsorbent comprises an adsorbent selected from the group consisting of active carbon, montmorillonite, diatomaceous earth, activated silica, aluminosilicate, and activated clay, (ii) next mixing the resultant liquid dispersion with a liquid formulation of a flocculating agent, (iii) maintaining the admixture which then results under nonshearing agitation until same separates into a flocculated phase and a liquid solution phase, and (iv) thence separating therefrom the flocculated phase and a purified, product acid liquid solution phase.

* * * * *